United States Patent Office 2,943,715
Patented July 5, 1960

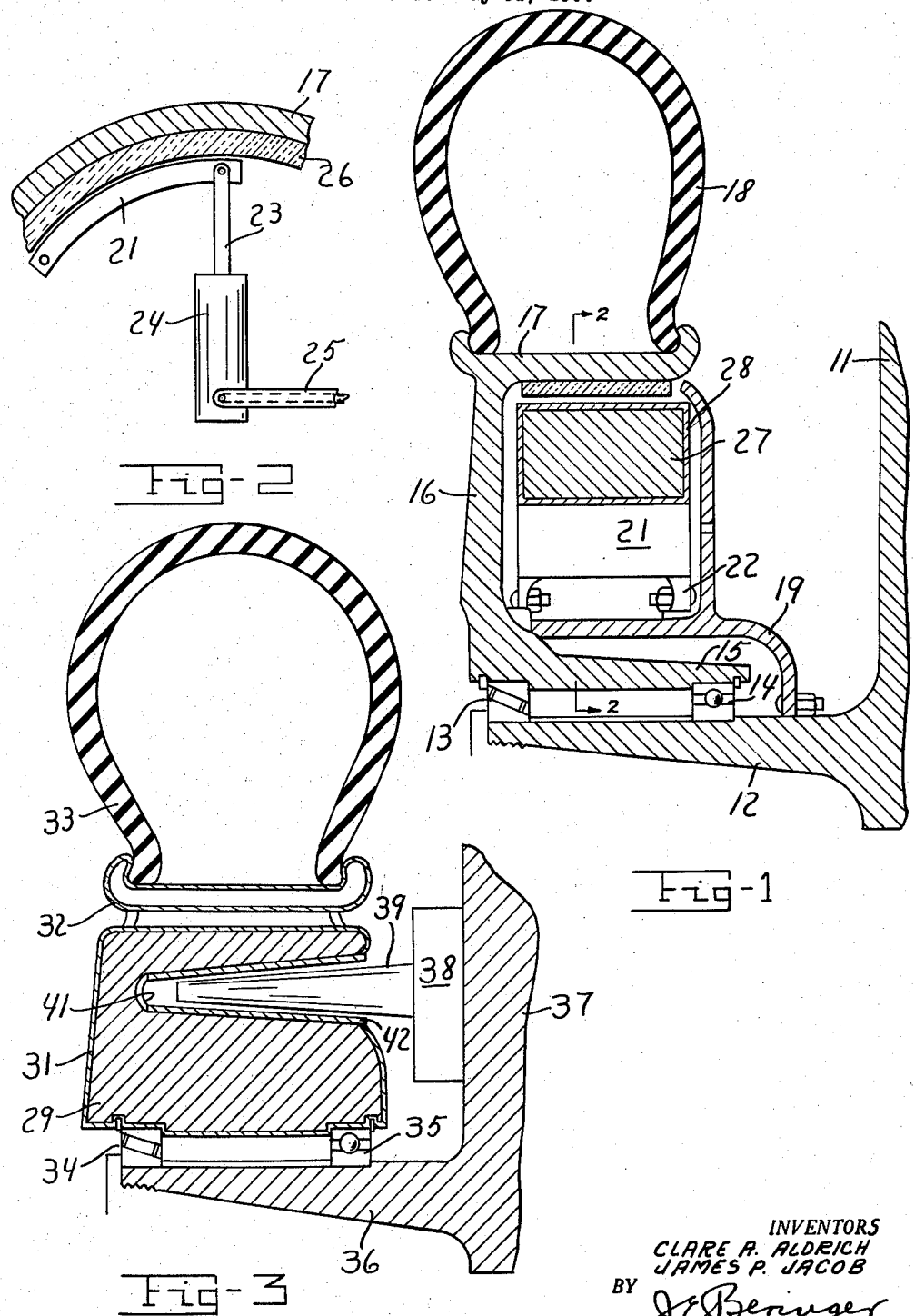

2,943,715

CAPACITANCE SYSTEM OF HEAT TRANSFER

Clare Aaron Aldrich and James P. Jacob, Dayton, Ohio, assignors to United Aircraft Products, Inc., Dayton, Ohio, a corporation of Ohio Filed May 31, 1956, Ser. No. 588,327

7 Claims. (Cl. 188—264)

This invention relates to capacitance systems of heat transfer and has especial although not limited reference to brakes for aircraft.

It is an object of the invention to introduce a principle of cooling by heat capacitance, in aircraft brakes and the like, whereby the relatively large and complex apparatus heretofore provided for such cooling purposes, may be dispensed with.

Another object of the invention is to utilize a material of high specific heat in a heat capacitance system which may be stationed close to the heat source, as for example a part of the braking surface in an aircraft brake.

A further object of the invention is to incorporate within the brake structure a part having the dual function of a heat absorber and of a brake applying means.

Other objects and structural details of the invention will appear from the following description when read in connection with the accompanying drawings, wherein:

Fig. 1 is a detail view, partly diagrammatic, of an aircraft wheel and brake therefor, showing a first illustrated form of the invention;

Fig. 2 is a detail view in longitudinal section, taken substantially along the line 2—2 of Fig. 1 with some parts omitted; and Fig. 3 is a view like Fig. 1, showing a second illustrated form of the invention.

Referring to the drawing, a relatively stationary frame part or strut 11 is formed with an axle 12 at right angles thereto. Mounted on the axle 12 are longitudinally spaced apart bearings 13 and 14 on which is mounted the hub 15 of a wheel disc 16. The upper end of the disc 16 has a turned over rim portion 17, on the outer surface of which is a tire 18. The elements of Fig. 1, it will be understood, comprise the upper part or half of a wheel and brake assembly, the bearings 13 and 14, the disc 17 and tire 18 being symmetrical about a horizontal line which may be considered to pass through the bottom of Fig. 1.

There is secured to the axle 12 a supplementary frame member 19 providing a support for an arcuately shaped brake shoe 21. The shoe 21 is pivotally connected at its one end, ts through legs 22, to the bracket 19. The opposite end thereof is pivotally connected to a rod 23 (Fig. 2) extensible from and retractable in a cyclinder 24. The latter is supplied with hydraulic fluid through a conduit 25, and in response to the development and the discontinuance of hydraulic pressures within the cylinder 24, the rod 23 is extended and retracted. An extending motion of the rod serves to press the shoe 21 against a liner 26 on the underside of the rim 17. Retracting motions of the rod 23 withdraw the shoe from contact with the liner 26. The wheel disc 18, rim 17 and brake liner 26, it will be understood, are in relatively rotatable relation to the axle 12, supplemental frame member 19 and brake shoe 21. With the assembly of parts comprising the wheel in rotation, if hydraulic pressure is supplied to the cylinder 24 and the rod 23 extended, the shoe 21 will contact and press against the brake liner 26 with the result that the kinetic energy of the turning wheel is dissipated by friction and transformed into heat. The developed temperature values may rise to destructive levels, as on the order of 1500° F. and higher but less than 2,000 degrees Fahrenheit.

According to the instant invention, the generated heat is disposed of by absorption into the brake shoe 21 which is comprised essentially of a material 27 having the properties of high specific heat, high conductance, and high melting point, as, for example beryllium. The material is suitably formed to the shape of a brake shoe and is encased in a sheath 28 which may be a plating or a separate shell. The sheath 28 prevents contamination of the atmosphere by the material 27 and further provides a wear resistant surface for contact with the liner 26, as well as a protective casing for the handling thereof. Beryllium has a high heat capacity per cubic inch, as well as an excellent heat transfer coefficient. It maintains reasonable strength up to its melting point (2342° F.) and has good tensile strength. The material is stable and corrosion resistant, and has a coefficient of expansion paralleling that of pure iron so that its use in conjunction with iron or steel parts does not create problems of differential expansion.

According to the embodiment of the invention shown in Fig. 3, the beryllium or material 27 of the first considered embodiment is used in the constructing of a wheel hub 29 covered by a protective casing 31. The hub mounts a rim 32, which may contain the material of high specific heat, on which is a tire 33. The hub 29 is mounted through bearings 34 and 35 on an axle 36 extending from a strut 37. On the latter, is a hydraulic unit 38 including cone means 39 extending into a wedge-shaped recess 41 in the hub 29. The recess 41 is lined with a friction brake lining material 42. The cone 39 is extensible and retractable by the hydraulic unit 38 in response to the developing and discontinuing of hydraulic forces within such unit. In response to development of the hydraulic forces, the cone 39 is moved axially in the recess 41 until it engages the surface of the material 42. A frictional resistance to rotation of the wheel assembly accordingly is set up and the wheel is slowed and finally stopped, with the energy of motion being transformed into heat which is in turn absorbed into the material of the hub 29. The recess 41, it will be understood, is annular in form and tapering from the front to the bottom thereof to permit the cone 39 to free itself from engagement from the material 42 after a relatively limited withdrawal thereof in response to the discontinuing of hydraulic pressures within the unit 38. The cone 39 is in part symbolically represented. In terms of actual structure it ordinarily will be segmental in form to compensate for temperature induced expansion and contraction of the parts. The cone 39 may contain the material 27 in lieu of or in addition to the containment of such metal in the hub 29.

In the case either of the shoe 21 or of the hub 29, the material of which they are essentially comprised is solid. It is accordingly substantially unyielding in the sustaining and absorbing of applied pressures, as well as being an absorber of heat. Further, it will be understood that an article comprised of the material 27 and encasing shell may be fashioned for other forms and for other purposes than the limited number here illustrated. It might, for example, be made as a disc in a disc type clutch or brake to transmit or apply pressure and to absorb heat. Similarly it might take the form of an annular tank or hub upon which a band selectively is tightened.

Also, it will be understood that while the invention has been disclosed as applied to brake mechanisms, it is applicable as well to other mechanical devices which in their use may generate excessive heat, for example friction clutches.

What is claimed is:

1. A brake cooling system in a brake structure wherein relatively rotating and stationary parts selectively are brought frictionally into contact with one another, characterized in that at least one of said parts is in the form of a metal solid sustaining and transferring the pressures of such contact and having the properties of high conductance, high specific heat and high melting point, said solid being encased by a thin layer of metal of lower specific heat.

2. A brake cooling system according to claim 1, characterized in that the material of said metal solid is beryllium.

3. A brake system, including a wheel, a hub for said wheel made of a material of high specific heat encased by a thin layer of material of lower specific heat, a relatively stationary frame, and a part mounted on said frame and frictionally engageable with said hub to resist rotation of said wheel, the heat generated by such engagement being conducted through the casing of said hub and absorbed into the mass of said material, which mass sustains and transfers the pressures of the frictional engagement.

4. A brake system, including a wheel, a relatively stationary frame, said brake system comprising a brake shoe pivotally mounted on said frame in cooperative relation with said wheel, said shoe being made of a material of high specific heat and being encased by a thin layer of material of lesser specific heat.

5. A heat absorbing unit, comprising a thin shell of a first metal and a solid filler metal within said shell and lightly encased thereby, the combination of said shell and said filler metal defining a unit relatively rigid to sustain and to transfer applied pressures, said filler metal having the property of high specific heat, said unit being adapted for use as a part of means in conductive relation to a heat source with the unit performing an operational function and said filler metal absorbing created heat.

6. A heat absorbing unit according to claim 5, characterized in that said filler metal is beryllium.

7. A heat generating assembly wherein relatively movable elements are pressed frictionally together; characterized in that at least one of said elements comprises a thin shell of a first metal and a solid filler metal within said shell and lightly encased thereby, the combination of said shell and said filler metal defining a unit relatively rigid to sustain and to transfer applied pressures, said filler metal having the properties of high conductance, high specific heat and high melting point, the unit comprising said filler metal performing an operational function while said filler metal absorbs created heat.

References Cited in the file of this patent

UNITED STATES PATENTS

| | | |
|---|---|---|
| 903,049 | Bonner | Nov. 3, 1908 |
| 1,026,274 | McGiffert | May 14, 1912 |
| 1,876,917 | Gosslau | Sept. 13, 1932 |
| 2,093,771 | Colwell | Sept. 21, 1937 |
| 2,111,335 | Sanford | Mar. 15, 1938 |
| 2,407,197 | Watts | Sept. 3, 1946 |
| 2,537,174 | Townhill | Jan. 9, 1951 |
| 2,696,200 | Torre | Dec. 7, 1954 |

FOREIGN PATENTS

| | | |
|---|---|---|
| 759,942 | France | Dec. 6, 1933 |
| 1,157,984 | France | Jan. 6, 1958 |
| 638,573 | Great Britain | June 14, 1950 |
| 701,725 | Great Britain | Dec. 20, 1953 |